US005379377A

United States Patent [19]

Gowda et al.

[11] Patent Number: 5,379,377

[45] Date of Patent: Jan. 3, 1995

[54] DISPLAY SYSTEM PROVIDING A RASTER IMAGE OF A PHYSICAL SYSTEM WITH ITS CHANGEABLE OPERATING PARAMETERS DISPLAYED IN RELATED LOCATIONS ADJACENT TO THE IMAGE OF THE PHYSICAL SYSTEM

[75] Inventors: Anil K. Gowda, Eden Prairie; Jeffrey C. Randall, Minneapolis, both of Minn.

[73] Assignee: Honeywell Inc., Minneapolis, Minn.

[21] Appl. No.: 998,192

[22] Filed: Dec. 29, 1992

[51] Int. Cl.[6] .......... G06F 15/20

[52] U.S. Cl. .......... 395/162; 395/164; 345/214

[58] Field of Search .......... 364/188, 189, 474.22, 364/474.23, 474.25, 483, 492, 500, 514, 550, 551.01; 395/155, 161, 162-164; 345/214, 185; 382/56; 358/426, 261.1, 261.2

[56] References Cited

U.S. PATENT DOCUMENTS

| | | | |
|---|---|---|---|
| 4,509,043 | 4/1985 | Mossaides | 345/185 |
| 4,858,152 | 8/1989 | Estes | 364/550 |
| 4,916,628 | 4/1990 | Kugler | 364/550 |
| 4,967,381 | 10/1990 | Lane et al. | 364/551.01 |
| 5,132,968 | 7/1992 | Cephus | 370/94.1 |

FOREIGN PATENT DOCUMENTS

| | | | |
|---|---|---|---|
| 0141131 | 8/1984 | European Pat. Off. | G08B 25/00 |
| 0389132 | 3/1990 | European Pat. Off. | G07C 3/00 |
| 0425077 | 7/1990 | European Pat. Off. | G06F 15/74 |

*Primary Examiner*—Dale M. Shaw
*Assistant Examiner*—Kee M. Tung
*Attorney, Agent, or Firm*—Edward L. Schwarz

[57] ABSTRACT

A display system for dynamically indicating the status of conditions of a physical system shows as background on a raster display unit, a sketch of the physical system with text indicating the status of the various conditions juxtaposed to the sketch. In the preferred embodiment, the text for each condition is placed adjacent the general area on the sketch to which the condition pertains. It is intended that this display system will be implemented on a general purpose computer system by executing software which converts the computer system into the display system.

14 Claims, 5 Drawing Sheets

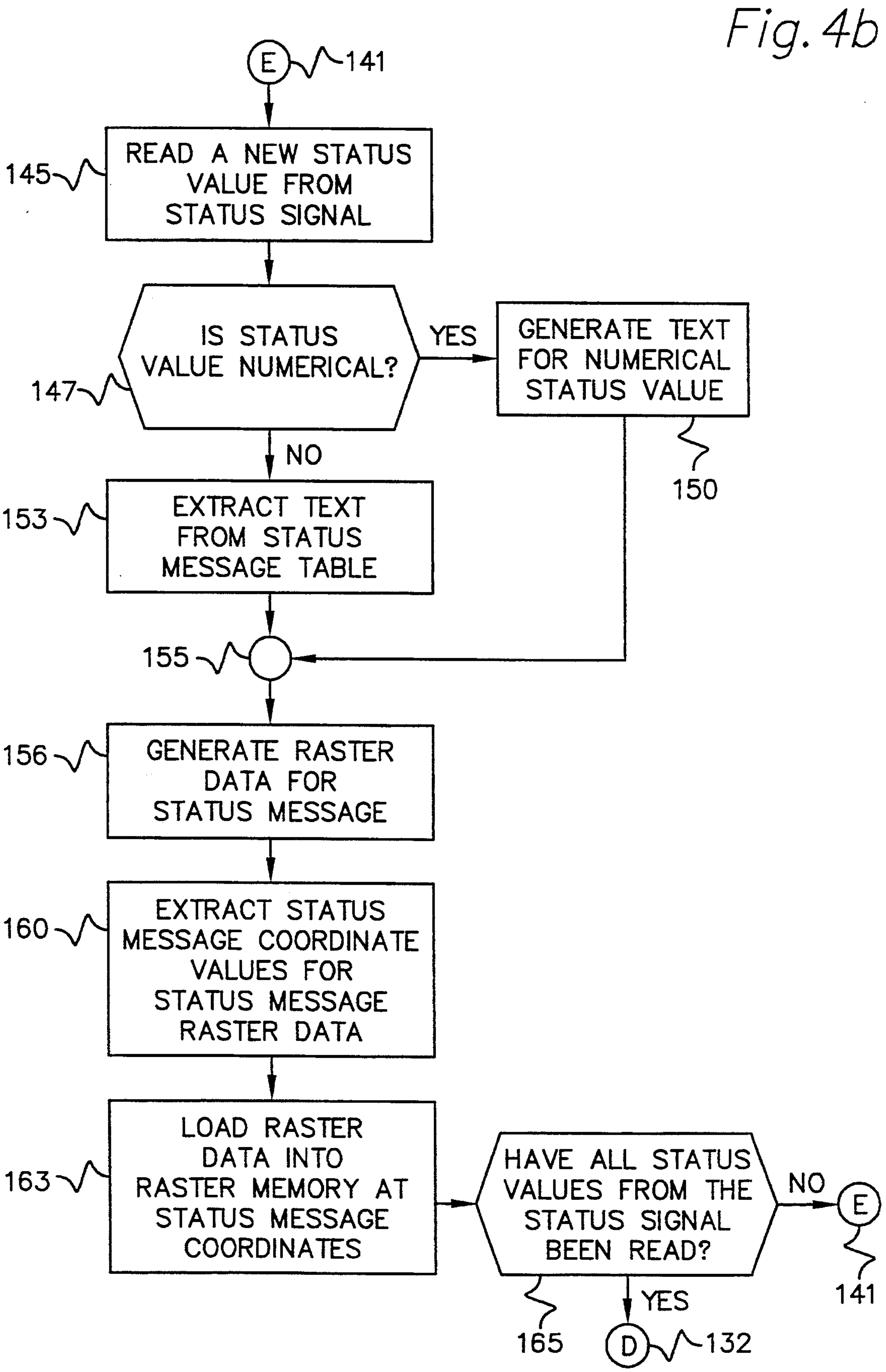
Fig. 4b
E
141
READ A NEW STATUS VALUE FROM STATUS SIGNAL
145
IS STATUS VALUE NUMERICAL?
147
YES
GENERATE TEXT FOR NUMERICAL STATUS VALUE
150
NO
EXTRACT TEXT FROM STATUS MESSAGE TABLE
153
155
GENERATE RASTER DATA FOR STATUS MESSAGE
156
EXTRACT STATUS MESSAGE COORDINATE VALUES FOR STATUS MESSAGE RASTER DATA
160
LOAD RASTER DATA INTO RASTER MEMORY AT STATUS MESSAGE COORDINATES
163
HAVE ALL STATUS VALUES FROM THE STATUS SIGNAL BEEN READ?
165
NO
E
141
YES
D
132

DISPLAY SYSTEM PROVIDING A RASTER IMAGE OF A PHYSICAL SYSTEM WITH ITS CHANGEABLE OPERATING PARAMETERS DISPLAYED IN RELATED LOCATIONS ADJACENT TO THE IMAGE OF THE PHYSICAL SYSTEM

BACKGROUND OF THE INVENTION

There are various physical systems which are controlled by a digital processor, but for which it is also advantageous to provide some level of human monitoring. Examples are electrical generating installations and other systems employing large fuel burners, chemical plants, large heating systems, and all kinds of manufacturing operations. It has been common for many years of course to measure or sense parameters or factors which define the current status of operating conditions of such physical systems, and to then display the current status values of the operating conditions. Those status values which are quantitative are converted to digital numeric or other quantitative form when displaying the related operating conditions. Examples might be pressure, temperature, voltage, etc. Those non-quantitative status values defining current operating conditions are used to select for display for each condition, an appropriate text informing the human monitor of the condition's status. Examples of such conditions might be whether a parameter is within a limit which of a number of operating phases the system is in, what elements of a system are currently operational. etc. These status values defining current operating conditions will be generally referred to hereafter as status information, and are gathered in real time by sensors or by a controller of the system for presentation to the operator who is monitoring operation. These sensors or controllers in which the status information originates are generally referred to hereafter as status sources. A single status source may provide status values for one or more operating conditions, depending on the source itself.

It is possible to display the condition status information in a variety of ways depending on the type of information and the preference of the presentation system designer and the user to whom the information is presented. Thus, one may display a simple numeric value for a quantitative type of condition on a dial or a digital panel, or use charts, graphs, etc. which may be more understandable in certain circumstances. Status of a non-numeric condition has traditionally been shown as a warning or status light on a control panel, or may be presented textually on an alphanumeric display panel.

In many large installations, there are various individual status information items which it is convenient to group together for presentation. This may occur where the installation comprises a number of individual units, each of which have a number of operating conditions which are related because of this common origin and whose status are logical to display in juxtaposition. Another type of condition status display arrangement may arise in these types of installations which have a number of similar units all of which have one or more similar types of conditions associated with them. Where similar such units are operating at the same time, it may be logical to display the status of each similar operating condition together. Heretofore, the procedure has been to simply provide a display element for each of the conditions, or to provide a display element to which a number of the status values defining the conditions may be multiplexed. Where a single display element displays a number of condition statuses, it may cycle either manually or automatically from one to another condition status. It can be thus seen that there are a number of different ways in which presentations of condition status may be done.

With the wide availability of low cost personal computers, it has become natural to consider how their speed, reliability, flexibility, and high quality display monitor may be adapted for the display of status for system operating conditions of an installation. For example, the use of computers for security monitoring of facilities has been done for some time. It is also well known to use a computer-based controller to display the status of conditions in the controlled system. In all except the simplest of systems, to avoid overwhelming the operator with an excess of information on the monitor, it is useful to display less than all of the status of conditions associated with an installation at any time. Such a grouping of a partial selection of condition status will be referred to hereafter as a "screen". In order to display the status of all of the conditions, more than one screen will be required. The operator in some manner selects the screen which contains the status of the conditions to be displayed, and then at his or her convenience, selects another screen, and in this way maintains an overview of the operation of the entire installation.

It is known to change from one screen to another by partially overlaying those selected earlier with the more recently selected. This technique is known as windowing, and is commonly practiced by the operating systems for the various types of personal computers now in use. A new screen is selected by using a mouse or other pointing device to control a cursor which designates a desired screen from a list or menu. Operating a switch when the cursor is positioned on the descriptor of the screen ("clicking" on the item) in the selection list designates the particular screen for display. The size and position of each new screen can be controlled by the user, and in fact, a newer screen can be removed in order to reveal an earlier selected screen for redisplay.

A particular type of physical system for which such a computer-based information display is useful and for which the subject of this patent has been developed, comprises one or more burner installations having a number of individual large fuel burners. In these burner installations, each burner is controlled by its own controller which comprises a microcontroller along with a semiconductor memory for status values for the individual conditions. This memory is conventionally referred to as a random access memory (RAM), and functions as a status source from which is provided status information pertaining to the operating conditions of the burner involved. The control algorithm is executed on a continuous basis by the microcontroller to sequence and time the various phases of operation of its burner. Parts of the control algorithm also allows the controller to meter flow of fuel and air to its burner dependent on demand requests from the user and on signals provided by sensors attached to the burner. These sensors, which may also be considered status sources and which measure the quantitative parameters associated with operation of the burner. These parameter values as well as the operating status are recorded in the RAM for use in performing the control algorithm.

In the particular type of burner installations involved here, a communication module or gateway may have a number of burner controllers connected to it. The communication module receives commands and requests directed to each of the burner controllers from a central computer, typically a small desktop unit, and relays these to the specified controller. The communication module also provides status information received from the individual controllers to the central computer for display to the operator. The communication module is connected to a data port of the central computer either directly or via a modem link. The communication module thus functions as a bi-directional multiplexer which provides status information from the several controllers forming status sources to the central computer, and then routes commands and requests from the central computer to the controllers.

In either the directly connected or modem-connected case, the central computer may be located at some distance from the actual burner installation. This provides safety for the operator and security for the control system by avoiding a situation where malfunction of the installation might prevent access to the central computer or might affect or damage the central computer. However, when the operator is remotely located, it is necessary that status information for the installation is provided in a timely, accurate, and accessible fashion. Experience shows that the information in lists of status for conditions is not quickly absorbed by an operator. In an emergency this may result in failure of the operator to notice or to understand the problem and consequent delays in the response to it.

Operators of these types of systems are not usually skilled computer professionals. Accordingly, presentation of information to them by the display system in a simple and intuitively understandable format allows them to easily learn how to use the system. Further, a simplified interface allows inexperienced and unskilled operators to quickly determine status of the installation when human intervention is required for safe operation. The use of tables and even graphs and charts is not an appealing way of presenting status information for such a system. Accordingly, a display system whose presentation ties the physical structure of the installation to the status of its operating conditions in a readily understandable or intuitive format is a substantial improvement over systems which present the same information in a more abstract arrangement. At the same time, such a display system allows safer and more efficient operation of the installation.

BRIEF DESCRIPTION OF THE INVENTION

The ability of the operator of a physical system to manage that system is enhanced by an information display system which displays in an improved format the status of conditions associated with that physical system, and this is the main purpose of this invention. The physical system is assumed to be one which can be represented as a pictorial representation. Each condition of the physical system has a status specified by a status value. Each status value is encoded in a status signal provided by a status source associated with the physical system.

The display system of this invention in a typical embodiment is comprised of a personal computer which by executing instructions, functions as the actual elements of the invention. The display system includes a processing unit providing a status request signal to the status source encoding at least a first condition code specifying a first condition, and receiving from the status source in response a status signal encoding at least a first status value specifying the status determined by the status source for the first condition code included in the status request signal. The display system also includes a processor memory recording data provided by the processing unit and supplying previously recorded data to the processing unit.

For displaying the status of the individual conditions, the display system includes a raster display unit comprising a raster memory having data storage locations in which the processing unit may record and alter a raster image. The raster image in the memory is conventionally formed of individual pixels whose positions in the raster image are designated by coordinate values which also designate the data storage locations in the raster memory in which data bits forming the pixel states are recorded. The raster memory supplies a raster signal encoding the raster image recorded in the raster memory to a display unit. The display unit displays an image which represents the raster image encoded in the raster signal on a display screen forming a part of the display unit.

The display system also includes an input port receiving externally generated data signals and providing the externally generated data signals to the processing unit.

The invention comprises a number of elements in the processing unit which in the preferred embodiment are formed by the execution of appropriate instructions by the processing unit. There is a first raster background generating means for recording in the raster memory, pictorial raster data for at least one pictorial image of a physical system. Typically, this might be the outline of the physical system showing the various features whose conditions are important for the operator to know in order to understand the current operating status of the physical system.

Condition code signal generating means supply a condition code signal encoding at least a first condition code. Typically of course, the condition code signal will encode a relatively large number of condition codes, since this invention is fully capable of displaying scores of condition status values, and for the types of physical systems which justify a display of this complexity, there will usually be a relatively large number of conditions of interest.

Second raster background generating means record in the raster memory data storage locations designated by preselected label coordinate values, label raster data for a label message for at least the first condition code. Each status value must be labeled in some way in order to allow the operator to quickly and accurately determine the condition to which it applies, and the label message performs this function. The label message will typically be located in the raster image close to the part of the pictorial image to which the condition applies whose code designates that label message. The label coordinate values specify such a position in the raster image. The label message may be textual, or may be a symbol of some type which indicates the type of information which the associated condition involves. For example, if the condition is a temperature, the label message may be a depiction of a thermometer.

Status message coordinate means receive the condition code signal and record in the processor memory, status message coordinate values designating a preselected position in the raster image of a status message associated with the first condition code. There will usually be a status message for each label message, and therefore several or many status messages will be displayed. The operator will typically prefer that the status message be positioned close to the label message in the raster image so that the label message and the status message together appear to form a single message with logical syntax if textual. The status message coordinate means also provide a status coordinate signal encoding the status message coordinate values recorded in the processor memory.

Status request signal generating means receive the condition code signal and provide to the status source a status request signal encoding at least the first condition code. In response, the status source provides a status signal to a status message generating means, which also receives the status coordinate signal. The status message generating means uses the status value encoded in the status signal to generate status raster data for a status message dependent on that status value. The status message generating means copies the generated status raster data into the raster memory data storage locations designated by the status message coordinate values encoded in the status coordinate signal and which are associated with the condition code which is associated with the status value in the status signal.

For displaying numeric status values, the status message generating means generates for each condition having a numeric status value encoded in the status signal, a status message representative of that status value. This means then generates status value raster data forming a raster image displaying this numeric value, and copies the status value raster data into the raster memory data storage locations specified by the associated status message coordinate values.

It is advantageous to update the status values as frequently as possible, so the preferred embodiment conditions each status request signal on receipt of a status signal. A certain amount of time is required to transmit each of these signals and to prepare the response. This time provides an acceptable cycle time between each status request signal.

BRIEF DESCRIPTION OF THE DRAWINGS

FIGS. 4A and 4B together form a flow chart of software which, when loaded into a conventional personal computer such as shown in FIG. 1 and into which the tables of FIG. 2 have been loaded, causes the computer to comprise the invention.

DESCRIPTION OF THE PREFERRED EMBODIMENTS

Figure 1:
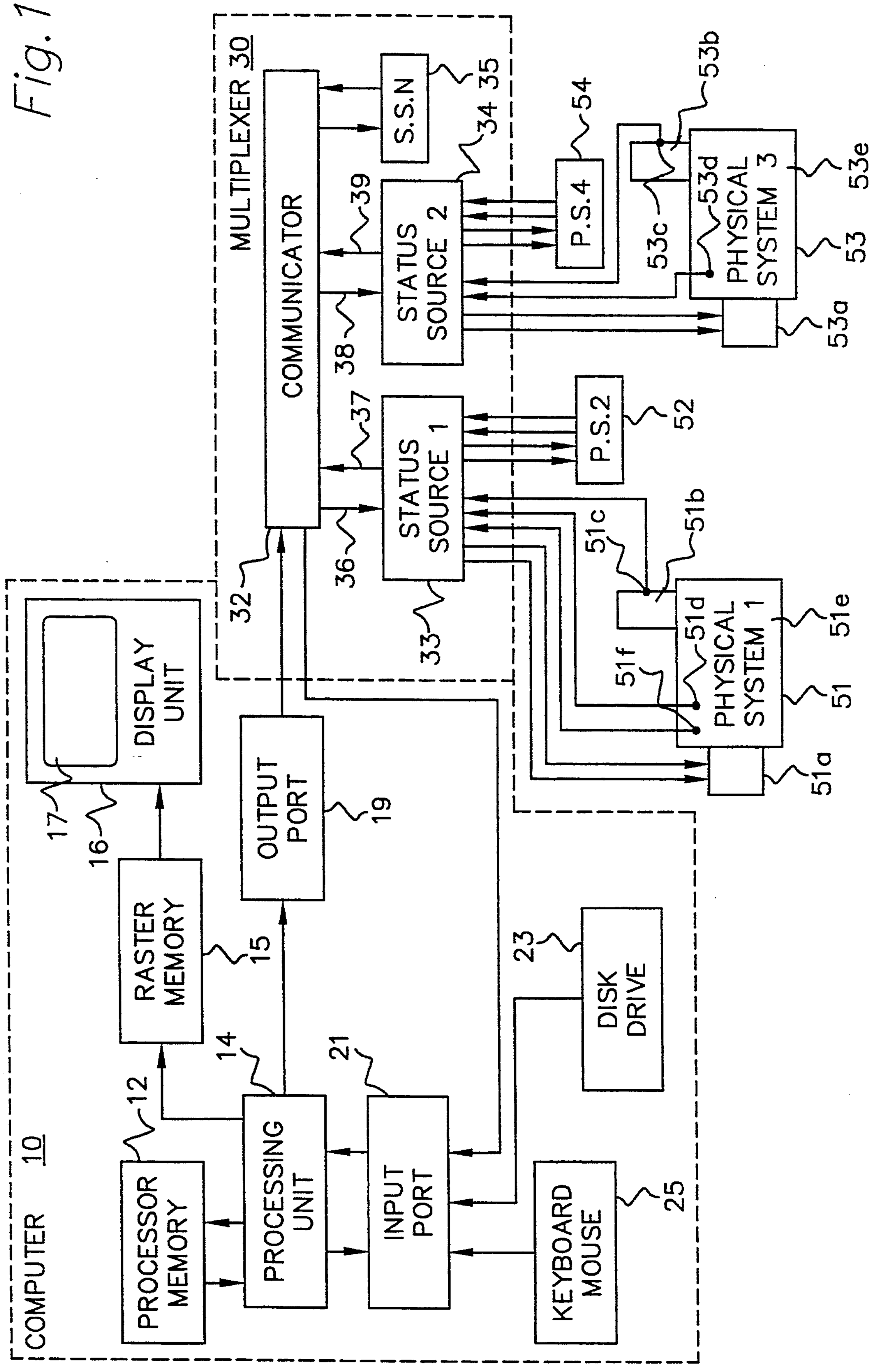
FIG. 1 is a block diagram of a system in which the invention may be implemented.

Turning first to FIG. 1, the computer 10 is intended to be loaded with software instructions which configure the computer 10 to comprise the invention. The actual processing of instructions occurs within processing unit 14. The instructions are stored in a processor memory 12 from which they are retrieved by processing unit 14 for execution. In the following description, no distinction between volatile random access memory (RAM) and a hard disk drive which provides non-volatile storage of programs is necessary. It is well known that the operating systems which manage the data transfers between the memories of such personal computers cooperate with the application software to load the instructions to be executed into the RAM. An input port 21 provides communication from external sources of data to the processing unit 14. The computer 10 of course also has an output port 19 by which data can be supplied from the computer 10 to external devices.

The instructions which configure computer 10 to operate as the invention are .initially written onto a floppy disk and then installed in the computer 10 through a disk drive 23, although there are also other means by which these instructions may be installed. The processing unit 14 receives the instruction data from input port 21 and transfers it to the processing unit 14. The operator can also communicate with the processing unit 14 through a manual input device shown as a keyboard/mouse 25.

For display of information, computer 10 must have a display unit 16 in which there is a display screen 17. Display screen 17 is of the raster image type, meaning that there is a rectangular grid pattern comprised of individual points or pixels, any of which may be changed to one or another of at least two, and perhaps as many as tens of thousands of different visual impressions in the case of a high resolution color monitor type of display unit 17. The term "raster" means that the individual pixels are sequentially set by electronic circuitry forming a part of the display unit 16 within a horizontal line to a desired visual impression. The individual lines or rows of pixels are also sequentially addressed so that after a period of time, all of the pixels in the display screen 17 have been set to the visual impression currently desired for each. The positions of the individual pixels within the raster image provided by display screen 17 can be designated by coordinate values which specify the row and column for each pixel.

The information designating the visual impression to be provided by each pixel is stored in a raster memory 15 which has for each pixel a storage location in which is recorded information specifying the visual impression to be provided by its associated pixel. It is convenient to consider the coordinate values designating the pixel positions as designating the addresses of storage locations in raster memory 15 in which the associated display information is recorded. The raster information for individual pixels in raster memory 15 is supplied to display unit 16 in synchronism with the creation of the individual pixels' visual impressions. Processing unit 14 records raster information in memory 15 according to operations performed by execution of instructions, changing the raster data for each of the pixels as instruction execution requires. Accordingly, it is possible for the processing unit 14 to directly control and change the raster image displayed by the display unit 16 on its display screen 17.

In the actual display application for which the invention has been developed, a multiplexer 30 receives signals from the output port 19 of computer 10 and provides signals to the input port 21 of computer 10. There may be a number of different multiplexers 30, each connected to a different channel of the input port 21 and the output port 19. It is also preferred to have modem connection capability, so that by dialing and connecting with a remote modem connected to a multiplexer 30, the computer 10 can display the status of conditions within a remotely located physical system. This function is well known and so need not be explicitly shown.

In general, this display system allows the status of conditions for a number of different multiplexers 30 to be shown. It is necessary that the system have available the configuration of each of the multiplexers 30 which may be selected.

Multiplexer 30 includes a communicator module 32 which communicates with status sources 33, 34, 35, etc. through multiplexer input and output ports 36–39 each of which have a port number unique within a particular communicator 32. For example, the system of FIG. 1 shows status source 33 connected to receive data signals from output port 36 of communicator 32 and to provide data signals to communicator 32 on input port 37. Status source 34 similarly communicates with communicator 32 via output port 38 and input port 39. The output port number to which each of the status sources 33–35 is attached identifies that status source 33–35.

Each status source 33–35 is connected to allow data transfer between itself and one or more physical systems 51, 52, 53, 54, etc. In our preferred embodiment, at least some of the status sources 33–35 function as controllers for the physical systems 51–54 to which they are attached. Each status source 33–35 has an internal memory in which is recorded the status for each of one or more conditions pertaining to the operation of the physical system(s) 51–54 attached to the status source 33–35. The individual status sources 33–35 determine conditions within physical systems 51–54 either by communications from the physical system or by recording operating commands previously issued to the physical system. In the system shown in FIG. 1, two of the physical systems 51–54 are connected to each of the status sources 33 and 34. Two or more physical systems connected to a single status source is the general case. In the existing functional system employing the invention, there is however only a single physical system 51–54 attached to each status source 33–35.

Each of the status sources 33–35 provide the status of these conditions within the physical systems 51–54 attached to it, to communicator 32 on the connecting input port 37, 39, etc. Each condition has a condition code assigned to it, by which the condition is identified within the computer 10 and the individual status sources 33–35. The condition codes can be actual addresses or indexes to memory locations within the individual status sources 33–35 where information recording the status of the associated condition is held, or can index entries in a conversion table in the status source memory holding the actual addresses in the status source memory recording the status values for the condition codes.

As mentioned, the invention of this application has been developed for displaying the status of burner systems, and the individual physical systems 51–54 are shown in FIG. 1 with outlines representing burner systems. Thus for physical system 51, there are features of the outline representing a fuel-air metering module 51*a*, a combustion chamber 51*e*, and an exhaust stack 51*b*. Representative condition sensors 51*c* and 51*d* are located at points within the physical system where it may be desirable to measure or sense operating conditions. For example, for the burner system 51 shown, sensor 51*c* may provide a signal indicating stack temperature and the signal from sensor 51*d* may indicate combustion chamber temperature. In addition, other conditions of interest may be the identity of the current phase of an operating cycle, or improper or degraded operation of the physical system sensed by the status source 33–35 involved.

Status values defining the status of the various conditions are provided in a status signal to input port 21 from communicator 32. Communicator 32 initiates each status signal transmission in response to a status request signal provided by processing unit 14 through output port 19 to communicator 32. The status request signals specify each of the conditions for which status values are required by encoding each of the associated condition codes, along with the port number of the status source 33–35 whose memory records the status values of the conditions. The multiplexer 30 provides status values for each of the requested condition codes. There are in essence thus two levels of multiplexing which are used in multiplexer 30.

Display apparatus built according to the invention can easily accommodate a variety of different types of status sources 33–35 and physical systems 51–54, and configurations of status sources and physical systems. As an example of a different status source type, FIG. 1 shows a physical system 1 51 with a third sensor 51*f* attached to combustion chamber 51*e*. If the user wishes the display for status source 1 33 and physical system 1 51 to include the status of the condition sensed by sensor 51*f*, this is considered a different status source type, and will be treated separately when processing the status values for it. The preferred embodiment of this display system is particularly directed at a situation where there are a number of multiplexers 30, to each of which are connected a number of status sources 33–35 in turn connected to a number of physical systems 51–54. The configuration of conditions whose status is to be displayed is identical for at least two of the physical systems 51–54 and the status source to which they are connected, so that the appearance of the display on screen 17 for each of these physical systems is identical.

For convenience hereafter, an image created on screen 17 showing the status of a number of conditions against the background of a representation of a physical system 51–54 will be referred to as a condition status display screen, or a status display screen. The status of each condition presented in a status display screen is contained in a message generally having two parts. One part is the label message which is unchangeable for the duration of the information display pertaining to a particular status source. The second part is the status message, whose text depends on the current condition status which the message displays. The status message may be text prestored in the processor memory 12. In this case, the status value for the condition included in the status signal specifies the prestored text, and the software then loads the raster image for this text into the appropriate part of the raster memory 15 for display on the screen 17. The status message may also be derived from a numerical status value contained in the status signal. A numeric status value is converted into status raster data representative of the numerical status value and then recorded in the appropriate locations of the raster memory 15.

Figure 2:
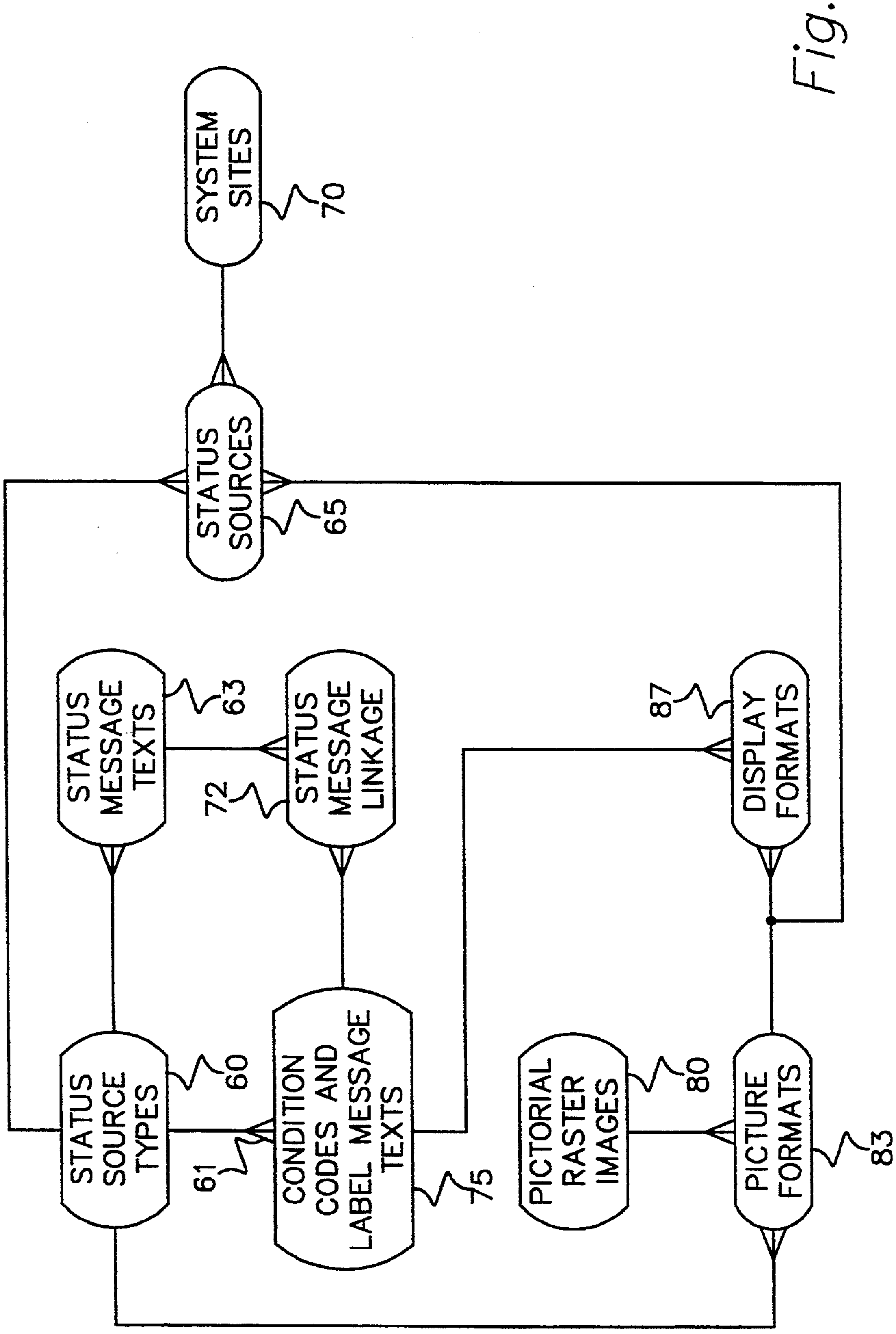
FIG. 2 is a relational block diagram of the tables containing the bit map and textual information displayed by the invention.

FIG. 2 is a diagram of the tables which hold the various data needed to allow the information pertaining to the various physical systems to be requested from a multiplexer 30 and to be displayed in an understandable manner. All of these tables are stored in the processor memory 12, from which individual entries can be retrieved with an index specifying the entry by processing unit 14 when executing instructions which address a particular table. Some of the entries in the tables are created during installation of the display system software. Others may be created by the operator while configuring the system to the particular installations for which the display system functions. Some of these tables contain text for display. Others simply provide links between tables. The notation used showing a number of lines emanating from a single connection line as at 61, means that a single entry at the single line end (at status source types table 60) may have a number of related entries in the condition codes table 75. The following discussion and explanation of the different tables diagrammed in FIG. 2 should be referred to as a whole. That is, the interrelation of the various tables on occasion requires reference in the discussion of one table to one or more others which have not yet been discussed. To save space, we prefer to store texts in these tables as ASCII or other code and then convert to raster data as required, but these texts can also be held in these tables as actual raster data.

System Sites Table 70

Table 70 holds the information pertaining to the individual multiplexers 30 and how they are accessed by computer 10. Each separate geographic site must have its own multiplexer 30, and there is an entry for each multiplexer 30 in the system sites table 70. Each entry in the system sites table 70 has a unique site code, and includes the information necessary for establishing a communications link between computer 10 and the multiplexer 30 at the particular site. Each system sites table entry specifies whether its related site is local or remote and if local, identifies the channel of the input port 21 and output port 19 which communicate with the multiplexer located at the site. If the site is remote, the system site table entry for the site specifies this fact and lists the telephone number for the modem at the site which allows communication between the multiplexer at that site and the computer 10. It is also convenient to includes an identification message text which includes the name, address, and any other information pertaining to the site to which the system sites table entry relates. The identification message is typically displayed on the screen to assist the operator in identifying the source of the information displayed. A system sites table entry might have the following format:

SITE CODE LOCAL/REMOTE FLAG INPUT CHANNEL NO. OUTPUT CHANNEL NO. TELEPHONE NO. SITE NAME SITE ADDRESS

Status Source Types Table 60

Table 60 specifies the types of status sources 33-35 from which the status of conditions is available for display by the system. Each entry in table 60 includes source type text for recording in the raster memory 15 at a standard raster image location the type of the status source with which the entry is associated. Each entry in table 60 has its own status source type code by which the status source is identified within computer 10. Each of the status source types table 60 entry has these fields:

Condition Codes and Label Message Texts Table 75

Each entry in condition codes table 75 pertains to a single condition and includes both the code of the status source type to which it is related and a code for the entry's condition, i.e., the entry's condition code. There is an entry in table 75 for every one of the conditions which each of the status sources maintains. All of the condition codes relating to each status source type are unique, but from status source type code to status source type code, condition codes will typically be duplicated. In the representative configuration of FIG. 1, there is more than one physical system attached to a single status source 33 or 34. Each condition in physical systems 51 and 52 for example whose status is to be displayed, must have a condition code different from all of the others provided by status source 1 33.

The status of individual conditions may be either numerical or non-numerical, indicated by a status value type flag in the condition code table entry for each condition code. Numerical status has a quantitative value which is to be displayed. Examples may be a specific pressure or temperature value. Non-numerical values indicate fault or operating conditions, current phase in an operating sequence, etc. The example below relating to stack temperature is for a non-numerical status.

In addition to the condition code, each table 75 entry holds the related label message text to be displayed when or if the status of the entry's condition is displayed. The label message texts in a display are the unchanging parts of messages for a condition. The label message texts form the descriptions of the displayed status values relating to the condition code involved. There is in general a label message text for each condition code. The label message texts in the condition code table 75 are encoded in a standard code such as ASCII, and software in the operating system converts these codes to the raster image which corresponds. The label message texts are retrieved by indexing table 75 with the related condition code and status source type code.

As an example, the label message text for a stack temperature condition in a burner system might be:

STACK TEMPERATURE RANGE

This label message text will be displayed on screen 17 adjacent to the portion of the outline representing the exhaust stack of the burner, With a status message text inserted in the blank space. For the example above, the status message texts for this label message text might be "WITHIN" and "OUT OF" so the complete message would then be either:

STACK TEMPERATURE WITHIN RANGE or

STATUS SOURCE TYPE CODE STATUS SOURCE TYPE TEXT ||

-continued
STACK TEMPERATURE OUT OF RANGE.

Each condition code table entry has these fields:

STATUS SOURCE TYPE CODE CONDITION CODE STATUS VALUE
TYPE FLAG
LABEL MESSAGE TEXT

Status Message Texts Table 63

Table 63 lists all of the different status message texts available for the variable or changing parts of the individual messages, i.e., those conveying the status of conditions selected for display, other than the texts for numerical values derived by converting a numerical status value to the equivalent text. Since there are always at least two different status message texts available for each condition code, a number of different table 63 entries are associated with each condition code entry in table 75. Since there may be a large number of different status sources whose conditions are available to be included in a status display screen on occasion, the use of a single table to store all of these possible status message texts'substantially reduces the memory space required.

Each entry in this table includes the following fields:

STATUS MESSAGE TEXT STATUS MESSAGE INDEX
STATUS SOURCE TYPE CODE

Status Message Linkage Table 72

Table 72 links the status message texts table 63 with the label message texts table 75. Each entry in table 72 includes a status source type code, a status value code: a condition code; and the index of the appropriate status message in the status message texts table for that combination of status source type code, status value, and condition code. The status value encoded in the status signal for the code of the particular condition is used to specify the entry in table 72 which has the proper index for the status message text in table 63 which indicates the status of the condition involved. In this way, each status message text need be recorded in the processor memory 12 only once, with multiple references in the status message linkage table 72 to a single message if it is used in more than one condition message.

Each entry in the status message linkage table 72 has these fields:

STATUS SOURCE TYPE CODE STATUS VALUE CONDITION CODE
STATUS MESSAGE INDEX

Pictorial Raster Images Table 80

Table 80 holds the raster data for the pictorial image of the outline of the physical system 51–54 which will be shown on the display screen 17 of FIG. 1. When a particular status source 33–35 is first selected for display from status source table 65, a related entry from table 80 is loaded into raster memory 15 to initially clear any residual raster data from an earlier display of condition status information.

An entry in table 80 has these fields:

PICTURE NUMBER PICTURE RASTER IMAGE

Picture Format Table 83

Table 83 ties together the various parameters which define each status display screen. Each entry in table 83 has a unique picture format code. An entry in the picture format table specifies appearance format parameters for a condition display screen, that is for one combination of a pictorial image, and a status source type. The picture format code defines the display format file which is the list of condition codes identifying the conditions displayed in the associated condition status display screen. The appearance parameters include such things as text format (color, font, pitch, etc.). Each picture format table entry also includes text for the name of the physical system(s) 51–54 whose outline is shown in the display.

A picture format table 83 entry has the following fields:

PICTURE FORMAT CODE STATUS SOURCE TYPE CODE PICTURE NUMBER
TEXT APPEARANCE PARAMETERS PHYSICAL SYSTEM NAME TEXT

Display Format Table 87

Table 87 contains a number of display format files, each comprised of one or more entries. Each entry includes a picture format code, a condition code, and a status source type code. Each display format file contains all of the condition codes for the conditions in a single condition status display screen. The picture format code in each display format table entry relates that entry to an entry in the picture format table 83. The condition codes in those display format table 87 entries having an identical picture format code collectively define the subset of system conditions for a display format file. The software implementing this invention when executed causes computer 10 to issue a condition code signal encoding all of the condition codes in a display format file. In the configuration of FIG. 1, the status display screens can be configured in a number of different ways, and there is a display format file for each status display screen. To make this a bit more concrete, one can imagine that the operator of this burner system might at one time want to see a display screen which shows all of the conditions associated with physical system 1 51. At another time, the operator may want to see all of the conditions associated with physical system 2 52, then all of the temperature-related conditions for both physical systems 51 and 52, and then perhaps all of the pressure-related conditions for physical systems 51 and 52.

Each entry in the display format table 87 also includes message format information which specifies parameters defining the appearance and position within the raster of the associated label message texts and its associated status message texts. The message format information in each entry contains raster coordinate values for its label message and for its status message which specify the precise location of each in the raster image. Normally, the label message and the status message for a given condition will be placed in close juxtaposition as illustrated for the example given in connection with table 70 above for label message texts. Both the label and status message texts will further be juxtaposed to the area of the pictorial image to which the message pertains. For the stack temperature condition message example above, it is logical to juxtapose the message to the portion of the outline of the physical system which represents the exhaust stack.

The display format table entries have a format which includes the following fields:

PICTURE FORMAT CODE CONDITION CODE STATUS SOURCE TYPE CODE
LABEL MESSAGE COORDINATES STATUS MESSAGE COORDINATES

Status Source Table 65

Table 65 identifies the types of status sources actually attached to each communicator 32 within a multiplexer 30 by including an appropriate status source type code in each entry. Each entry in the status source table 65 also specifies the communicator 32 output port number and an associated site code, thereby providing a complete address for the status source when status request signals are sent to it. By reference to this table, it is possible for the software to determine the configuration of the status sources attached to a communicator 32. Each status source table 65 entry includes a status source type code which relates the entry to a status source type. Each entry also holds a picture format code by which references to the display format table 87 will yield all of the condition codes for which status values will be requested. The format of the status source table 65 entries is then;

SITE CODE STATUS SOURCE TYPE CODE PORT NUMBER
PICTURE FORMAT CODE

Figure 3:
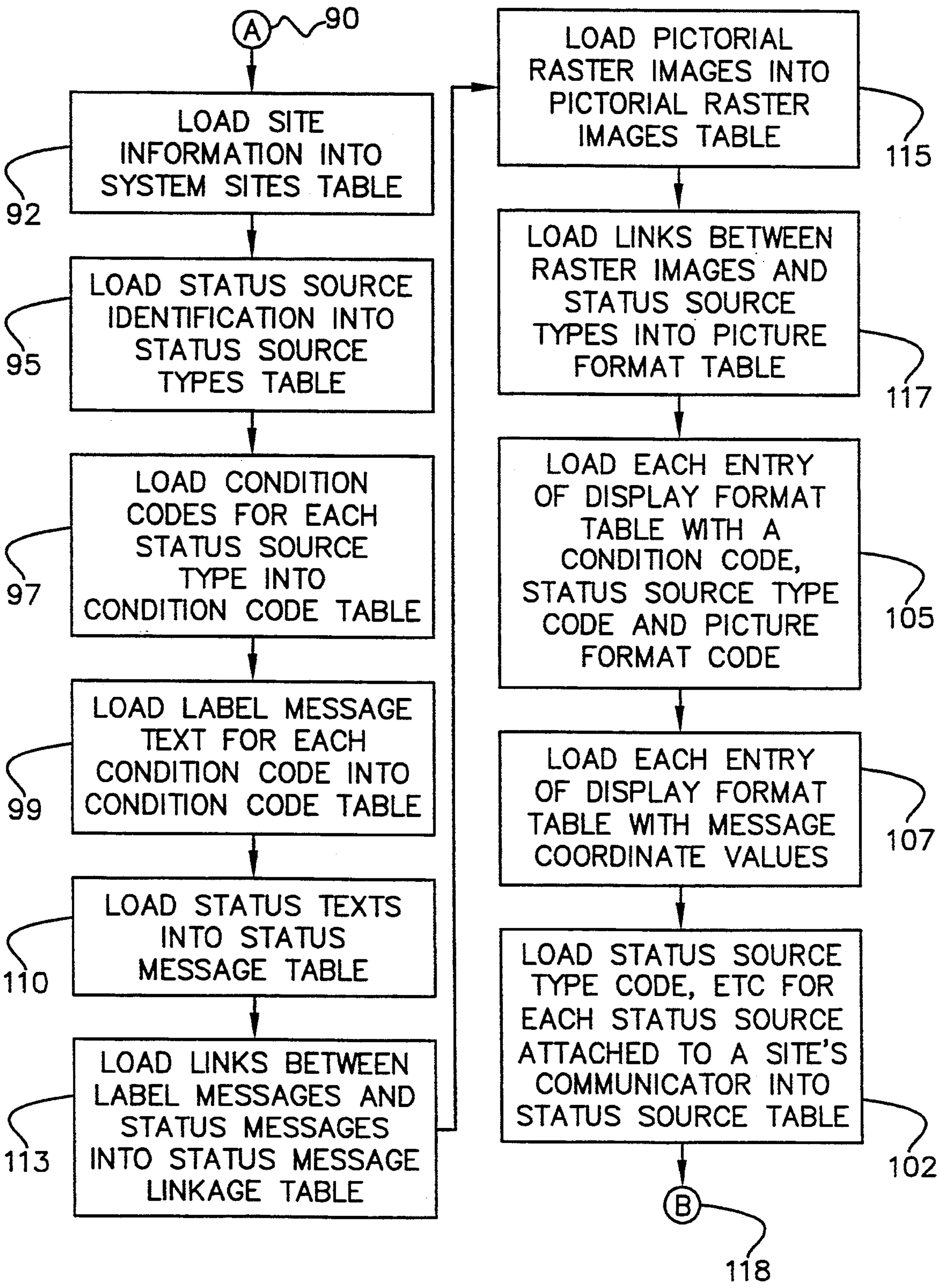
FIG. 3 is a flow chart of software which loads the tables of FIG. 2 into the processor memory of a conventional personal computer.
Figure 4A:
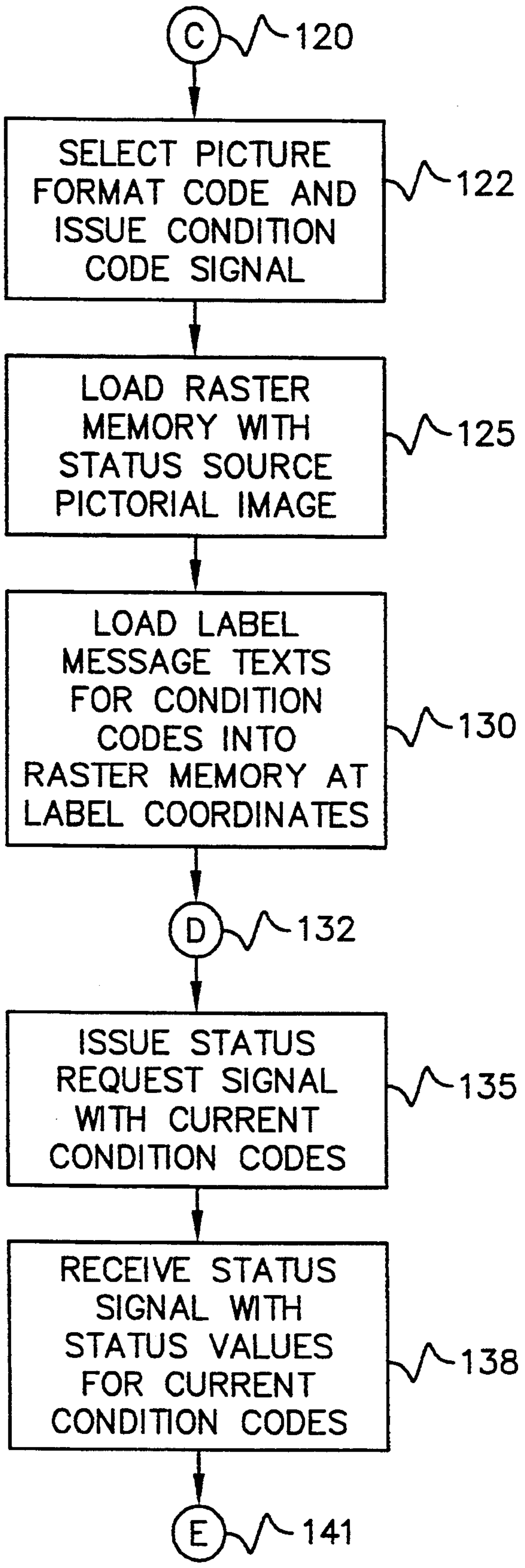

FIGS. 3, 4A, and 4B are flow charts of the software which configures computer 10 as the invention. By loading software constructed according to these flow charts into the computer's processor memory 12 and then by executing the instructions comprising the software, the various means comprising the invention are brought into existence when and for so long as they are needed, thereby in time sequence forming the invention. As the groups of instructions are executed which comprise these various means, the signals which the means are stated to produce actually come into existence within the processing unit 14 and frequently also within one or more of the other components of computer 10. The level of programming skill now generally existing is very high, so we believe that producing the actual software instructions from these flow charts is easy to accomplish.

Generally accepted symbol conventions are used in the flow charts of FIGS. 3, 4A, and 4B. Rectangular boxes such as at 92 in FIG. 3 represent data manipulation activity, and will be generally referred to as activity elements. Hexagonal boxes such as at 147 of FIG. 4B represent decisions based on the state of some data and will generally be referred to as decision elements. One of two paths labeled YES and NO emanating from the decision element is taken depending on the result of the decision. Small circles with or without a letter or text within them represents a connection or continuity between two other elements. Flow is generally from the top to the bottom of a page and from left to right on a page, and is indicated by arrows on the connecting paths.

The flow chart of FIG. 3 represents instructions which perform table setup activities. These activities may occur before any condition status display is performed and be simply transferring data from a prerecorded floppy disk inserted into disk drive 23, into the processor memory 12. It is also possible that many of the entries in these tables will be provided from the keyboard or mouse 25 by a user who enters the individual message texts and specifies table linkages which conform the display system to the particular kinds of status sources and physical system configurations which exist for the display system, or perhaps are added to the system after the display system is installed. It is possible that sophisticated input programs will be provided in some embodiments of this invention which will allow a simple and intuitive approach for a user in entering information which customizes the display system for the configuration of physical systems with which the display system is used. In general the sequence in which the groups of instructions for the activity elements of FIG. 3 are executed should occur in the order shown, because some tables cannot be completed until others have been. For example, table 95 must be finished before any table having status source type code fields is completed. All of the tables which are loaded by executing the instructions of FIG. 3 are stored in selected areas of the processor memory 12.

Execution of the instructions which configures computer 10 as the invention is shown as starting with the first of the group of instructions following connector A 90. The instructions symbolized by activity element 92 cause computer 10 to load site information into the system sites table. This information includes the telephone number for remotely located systems allowing the multiplexer 30 at the remote site to be dialed automatically.

The identities of each of the types of the status sources present in the display system is loaded into the status source types table 60 by the instructions symbolized by activity element 95. The entire set of condition codes assigned to each status source type are then loaded into the condition code table 75 by the instructions of activity element 97. In general, this group of conditions is larger than the group of conditions whose state is actually displayed in any particular status display screen and which form a subset of the conditions for the status source types in table 75.

The instructions symbolized by activity element 99 when executed cause computer 10 to comprise a part of a message format means which store label message text for each condition code in the condition code table 75 entry for that condition code by the instructions for activity element 99. The label message text forms a part of a message format file for the associated condition code. The instructions symbolized by activity element 107 discussed below comprise a further part of the message format means.

Executing the instructions of activity element 110 cause computer 10 to momentarily comprise a status text loading means which loads all of the possible status message texts into the status message texts table 63. As explained above, the status message texts are the variable portions of the condition messages, which indicate the current Status of condition described by the label portion of the message.

In the commercial embodiment which we have developed, the status message texts are not directly accessed. Instead, the status message linkage table 72 creates a file for each condition specifying two or more entries in the status message table 63 for that condition. The status value which specifies the status message references an entry in table 72 which specifies the desired status text in status message table 63. Executing the instructions symbolized by activity element 113 loads the status message linkage table 72.

When the instructions of activity element 115 are executed, the computer 10 becomes a pictorial image library means, which loads raster data for a number of pictorial images into the locations of processor memory 12 which hold table 80 of FIG. 2. These instructions may receive and process data generated from the keyboard or mouse 25 by a user. The instructions symbolized by activity element 117 also load picture format data into the locations of processor memory 12 comprising the picture format table 83. The picture format-data links picture numbers with status source type codes and includes text to be included in the status display screen specifying the type of status source for which condition codes are displayed.

The instructions of activity elements 105 cause computer 10 to function as a display format means which load entries of the display format table 87 with a condition code, a status source type code, and a picture format code. This creates a subset of the condition codes listed for each status source type, for a particular combination of a status source type code and a picture format code. These are the condition codes which will be displayed in the status display screen for a particular status source selection, and this group of display format table 87 entries having the same status source type code and picture format code and different condition codes define a display format file comprising a plurality of condition codes. Since there are a number of different options typically available for configuring the status display screen as to the condition codes displayed for a given status source, loading table 87 selects the configuration until this table is changed.

Executing the instructions of activity element 107 cause computer 10 to form the part of the message format means which loads the label message and status message raster coordinate values into the display format table 87. By properly setting these coordinate values, the positions of the status and label message texts will be located in the positions in the raster image which the user desires. These values may be created by calculations based on the position of a cursor controlled by a keyboard or mouse 25. Each entry for a given status source must have different coordinate values so as to prevent overlap in the raster image between the individual conditions' messages and message parts. The conditions message text raster coordinate values along with the label message text comprise the message format file for the associated condition code.

The instructions of activity element 102 load the status source type codes, the picture number, and the picture format code into the status source table 65. This links the status source types with the multiplexers 30 to which they are attached, and also links the pictorial raster image and the picture format data to the status source.

Executing the instructions symbolized by the activity elements of FIG. 3 sets up the tables which control operation of the invention. Execution of these instructions ends with connector element B 118.

FIGS. 4A and 4B symbolize instructions which select, construct, and update the desired status display screen. In general, the order in which the instructions symbolized by, the various instruction blocks of FIGS. 4A and 4B are executed is important.

Connector element C 120 indicates the starting point for these instructions. The instructions of activity element 122 cause computer 10 to comprise a display format'selection means which selects a picture format code. The picture format code may be derived from data provided by the keyboard or mouse 25, perhaps by moving a cursor to a menu image and selecting that image. The picture format code specifies one or more entries in the display format table which collectively comprise the display format file for that picture format code. It was mentioned in the discussion of the display format table that a display format file comprises all of the display format table entries having the same picture format code. Each of these entries has a different condition code, and collectively the display format file specifies each of the conditions whose status is to be displayed in the status display.

The display format selection means is part of the condition code signal generating means, which supplies the condition code signal. The condition code signal encodes the code for each of the conditions whose status is displayed in the status display screen. The condition code is used for a number of different purposes.

The picture format code specifies an entry in the picture format table 83. As explained in the description of table 83, there is a picture number in each entry of table 83. This picture number is an index to an entry in the pictorial raster images table 80. The instructions of activity element 125 cause computer 10 to comprise a first raster background generating means which reads the picture number from the picture format table specified by the picture format code and then uses the picture number to select a pictorial raster image from the pictorial raster images table. This selected pictorial raster image is of the status source supplying the status values for the status-display screen selected, and is then loaded into the raster memory 15.

The instructions symbolized by the activity element 130 cause computer 10 to comprise a second raster background generating means. These instructions use the condition codes in the condition code signal and the status source type code in the picture format table 83 entry specified by the picture format code to select each entry from the condition code table having one of these condition codes and the status source type code. The raster image corresponding to the label message text from each of these selected condition code table entries is inserted in the raster memory 15 locations corresponding to the label coordinates in the display format table for the status source type code and the associated condition code. As explained above in connection with the condition code table 75, the label message texts therein are encoded in a standard code format such as ASCII. Software in the operating system converts these codes to the raster image which corresponds, applying the text appearance parameters in the picture format table 83 entry'specified by the picture format code to determine the appearance of the label message texts in the raster image. The appearance parameters are provided to the operating system at the time the conversion occurs. Thus, it can be seen that all of the texts in a particular status display screen will have the same appearance.

Instruction execution then proceeds to connector element D 132 and from there to the instructions of activity element 135. Executing these instructions causes the computer 10 to function as a status request signal generating means. The condition code signal is created or recreated from the condition codes in the display format table specified by the picture format code. The condition codes in this condition code signal are encoded in a status request signal provided to the system site specified by the system sites table 70 entry for the current site code.

After a period of time, which may be even a few tens of seconds in the case where it is necessary to use a modem and dial a remote site, a status message generating means receives a status signal which encodes status values for all of the conditions whose codes were included in the just-sent status request signal. The status message generating means comprises computer 10 while it executes all of the instructions symbolized by the activity elements and the decision elements of FIG. 4B, other than the instructions of activity element 160. The instructions of activity element 145 cause computer 10 to retrieve each of the status values from the status signal in some preselected sequence, designating the condition code associated with each status-value as it is retrieved as the current status value.

The instructions of decision element 147 cause computer 10 to retrieve the status value type flag from the condition code table 75 for the current condition code and the current status source type code. If this flag indicates that the status value corresponding to the current condition code is numerical, then the instructions of activity element 150 are executed, which perform a conversion of this status value to generate a status message text representing this numerical value. If the flag indicates that the status value is non-numerical, then the instructions of activity element 153 are executed. These instructions use the current condition code and the current status value to designate an entry in the status message linkage table 72. The status message index in that entry is used to retrieve a status message text from the status message texts table 63.

After a status message text has generated by execution of either the instructions of activity element 150 or activity element 153, then the instructions of activity element 160 cause computer 10 to comprise a part of the status message coordinate means. This means reads out the status message coordinate values stored in the display format table 87, using the current condition code and the picture format code to select an entry, and encodes these coordinate values in a status coordinate signal. The instructions of activity element 163 then cause computer 10 to function again as the status message generating means, which receive the status coordinate signal and records the status message text generated by executing the instructions of either activity element 150 or activity element 153 in raster memory 15 at the raster coordinates encoded in the status coordinate signal.

Then the instructions of decision element 165 are executed, to determine whether all of the status values in the status signal have been read and loaded into the raster memory to update the status display screen. If not, then instruction execution transfers back to the instructions following connector element E 141 to extract a new status value from the status signal. If all of the status values in the current status signal have been read and their corresponding values in the raster memory 15 been updated, then execution of instructions transfers back to the instructions following connector element D 132, where another status request signal is issued by the instructions of activity element 135.

This endless instruction loop continues until an interrupt generated by the keyboard or mouse 25 causes instruction execution to transfer to connector element C 120 with a new picture format code, which generates a new status display screen. In this way, an operator is kept up to date on the current status of conditions maintained by the last selected status source and presented in the status display screen, and has the opportunity to change the designated status source and display screen at his or her discretion. The system is intuitive, inexpensive, and efficient, and substantially increases safety in operating potentially dangerous systems.

An expanded implementation of this invention allows a number of status sources connected to a single communicator 32 to provide status values for display in a single status display screen.

The preceding describes apparatus employing our invention. What we wish to claim is:

1. An information display system for displaying information pertaining to at least one of a plurality of conditions associated with a physical system, said physical system having a pictorial representation, wherein each condition has a status specified by a status value encoded in a status signal provided by a status source associated with the physical system, said information display system including i) a processing unit providing a status request signal to the status source including at least a first condition code specifying a first condition, and receiving from the status source in response a status signal encoding a first status value specifying the status of the first condition; ii) a processor memory recording data provided by the processing unit and supplying previously recorded data to the processing unit; iii) a raster display unit comprising a raster memory having data storage locations in which the processing unit records and alters a raster image, said raster image comprised of individual pixels whose positions in the raster image are designated by coordinate values which also designate the data storage locations in the raster memory in which data bits forming states of the pixels are recorded, and which raster memory supplies a raster signal encoding the raster image recorded in the raster memory, and a display unit receiving the raster signal and displaying the raster image encoded therein on a display screen; and iv) an input port receiving externally generated data signals and providing the externally generated data signals to the processing unit, said processing unit further including a) first raster background generating means for recording in the raster memory, pictorial raster data for at least one pictorial image of a physical system;

b) condition code signal generating means for supplying a condition code signal encoding at least a first condition code;

c) second raster background generating means for recording in the raster memory data storage locations designated by selected label coordinate values, label raster data for a label message for at least the first condition code;

d) status message coordinate means receiving the condition code signal, for recording in the processor memory, status message coordinate values designating a preselected position in the raster image of a status message associated with the first condition code, and for providing a status coordinate signal encoding the status message coordinate values recorded in the processor memory;

e) status request signal generating means receiving the condition code signal, for providing to the status source a status request signal encoding at least the first condition code; and f) status message generating means receiving the status coordinate signal and the status signal provided by the status source responsive to the status request signal, for forming for the status value encoded in the status signal and supplied by the status source responsive to the presence of the first condition code in the status request signal, status raster data for a status message dependent on that status value, and for copying said status raster data into the raster memory data storage locations designated by the status message coordinate values encoded in the status coordinate signal and associated with the first condition code.

2. The display system of claim 1, further comprising:

a) display-format means for recording in the processor memory, a plurality of display format files, each file comprising a plurality of condition codes; and b) message format means for recording a plurality of message format files in the processor memory, each in association with one of a plurality of the condition codes recorded in the display format files, each of said message format files comprising a label message text, label coordinate values for said label message text, and status message coordinate values for a status message text associated with the message format file's associated condition code;

wherein the condition code signal generating means further comprises display format selection means, for selecting a display format file, for reading from the processor memory the condition codes recorded in the selected display format file, and for issuing a condition code signal encoding the condition codes recorded in the a selected display format file;

wherein the second raster background generating means further comprises means receiving the condition code signal, for reading from the processor memory the message format file for each condition code encoded in the condition code signal, and for recording the label raster data in each of these message format files in the raster memory data locations specified by the associated label coordinate values;

wherein the status-message coordinate means further comprises means receiving the condition code signal, for reading from the processor memory the message format file for each condition code encoded in the condition code signal, and for providing the status coordinate signal encoding the status message coordinate values recorded in each of these message format files; and wherein the status request signal generating means further comprises means receiving the condition code signal, for providing a status request signal encoding each condition code encoded in the condition code signal.

3. The display system of claim 2, including pictorial image library means, for recording in the processor memory pictorial raster data for a plurality of pictorial images of at least one physical system, wherein the first raster background means further comprises means for selecting one of the plurality of pictorial images and for recording the pictorial raster data for the selected pictorial image in the raster memory.

4. The display system of claim 3, wherein the status request signal generating means further comprises means receiving the status signals, for providing a status request signal to the status source responsive to a status signal.

5. The display system of claim 3, wherein the message format means further comprises means for recording in the processor memory a message format file comprising label raster data for a label message including text.

6. The display system of claim 3, wherein the first raster background generating means further comprises pictorial select means receiving from the input port a pictorial select signal identifying one of the plurality of pictorial images of at least one physical system, for reading the pictorial raster data for the pictorial image identified by the pictorial select signal from the processor memory and for copying same into the raster memory.

7. The display system of claim 6 further comprising a manual input means in connection to the input port and cooperatively with the input port forming the pictorial select means for supplying the pictorial select signal.

8. The display system of claim 6 further comprising a manual input means in connection to the input port and coöperatively with the input port forming the pictorial select means for supplying the pictorial select signal and for selecting a display format file.

9. The display system of claim 3, further comprising status text loading means for recording in the processor memory, status texts for a plurality of status messages, and wherein the status message generating means further comprises means for selecting the status text for a status message as a function of a status value in the status signal.

10. The display system of claim 3, wherein a status source provides a first numerical status value encoded in the status signal responsive to the first condition code in the status request signal, and wherein the status message generating means further comprises means receiving the status signal and providing for the status message, status raster data representative of the first numerical status value.

11. The display system of claim 2, wherein the status request signal generating means further comprises means receiving the status signals, for providing a status request signal to the status source responsive to a status signal.

12. The display system of claim 2, wherein the message format means further comprises means for recording in the processor memory a message format file comprising label raster data for a label message including text.

13. The display system of claim 1, further comprising means for recording in the processor memory, status raster data for a plurality of status messages, and wherein the status message generating means further comprises means for selecting from the status raster data recorded in the processor memory, the status raster data for a status message as a function of a status value in the status signal.

14. The display system of claim 1, wherein a status source provides a first numerical status value encoded in the status signal responsive to the first condition code in the status request signal, and wherein the status message generating means further comprises means receiving the status signal and providing for the'status message, status raster data in text format representative of the first numerical status value.

* * * * *